United States Patent
Lim et al.

(10) Patent No.: US 11,152,606 B2
(45) Date of Patent: Oct. 19, 2021

(54) ELECTRODE ASSEMBLY AND RECHARGEABLE BATTERY INCLUDING THE SAME

(71) Applicant: SAMSUNG SDI CO., LTD., Yongin-si (KR)

(72) Inventors: Daeseop Lim, Yongin-si (KR); Hyejin Kwon, Yongin-si (KR); Bokhyun Ka, Yongin-si (KR); Ji-hoon Son, Yongin-si (KR); Kyeuyoon Sheem, Yongin-si (KR); Jinhyon Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 440 days.

(21) Appl. No.: 15/824,271

(22) Filed: Nov. 28, 2017

(65) Prior Publication Data

US 2018/0151867 A1 May 31, 2018

(30) Foreign Application Priority Data

Nov. 29, 2016 (KR) .................... 10-2016-0160664

(51) Int. Cl.
| | |
|---|---|
| *H01M 4/133* | (2010.01) |
| *H01M 50/463* | (2021.01) |
| *C01B 32/20* | (2017.01) |
| *H01M 4/02* | (2006.01) |

(52) U.S. Cl.
CPC ......... *H01M 4/133* (2013.01); *H01M 50/463* (2021.01); *C01B 32/20* (2017.08); *H01M 2004/027* (2013.01)

(58) Field of Classification Search
CPC ....... H01M 4/133; H01M 2/18; H01M 10/286
See application file for complete search history.

(56) References Cited

U.S. PATENT DOCUMENTS

| | | |
|---|---|---|
| 6,344,296 B1 | 2/2002 | Ishii et al. |
| 8,329,087 B2 | 12/2012 | Shimizu |
| 9,312,559 B2 | 4/2016 | Takahata et al. |
| 9,490,476 B2 | 11/2016 | Mitsuhashi et al. |
| 9,923,197 B2 | 3/2018 | Lee et al. |

(Continued)

FOREIGN PATENT DOCUMENTS

| | | |
|---|---|---|
| CN | 1230159 A | 9/1999 |
| CN | 102479935 A | 5/2012 |

(Continued)

OTHER PUBLICATIONS

Chinese Office Action and Search Report dated Jun. 12, 2020.
Korean Office action dated Oct. 22, 2020.
Chinese Office action and Search report dated Mar. 12, 2021.

*Primary Examiner* — Nathanael T Zemui
(74) *Attorney, Agent, or Firm* — Lee IP Law, P.C.

(57) ABSTRACT

An electrode assembly including a separator between a positive electrode and a negative electrode. Each of the positive electrode and the negative electrode includes a base member and an active material layer at at least one side of the base member. The active material layer of the negative electrode includes an alternating arrangement of orientation portions and non-orientation portions. Each of the orientation portions is oriented to have a constant angle with respect to one side of the negative electrode.

22 Claims, 13 Drawing Sheets

(56) References Cited

U.S. PATENT DOCUMENTS

| | | | |
|---|---|---|---|
| 2012/0034513 A1* | 2/2012 | Kim | H01M 2/0275 |
| | | | 429/186 |
| 2012/0135285 A1 | 5/2012 | Iwama et al. | |
| 2013/0022867 A1* | 1/2013 | Suzuki | H01M 4/366 |
| | | | 429/211 |
| 2013/0177792 A1 | 7/2013 | Takahata et al. | |
| 2014/0065478 A1* | 3/2014 | Mitsuhashi | H01M 4/0404 |
| | | | 429/211 |
| 2016/0079006 A1 | 3/2016 | Hosoe et al. | |
| 2016/0164079 A1* | 6/2016 | Bae | H01M 4/366 |
| | | | 429/231.8 |

FOREIGN PATENT DOCUMENTS

| | | |
|---|---|---|
| CN | 103430360 A | 12/2013 |
| EP | 3002807 A1 | 4/2016 |
| JP | 2004-220926 | 8/2004 |
| JP | 2009-295331 A | 12/2009 |
| JP | 4566255 | 8/2010 |
| JP | 5652682 | 11/2014 |
| JP | 5704413 B2 | 4/2015 |
| KR | 10-2013-0143644 A | 12/2013 |
| WO | WO 2012/039041 A1 | 3/2012 |
| WO | WO 2014-181809 A1 | 11/2014 |

\* cited by examiner

ELECTRODE ASSEMBLY AND RECHARGEABLE BATTERY INCLUDING THE SAME

CROSS-REFERENCE TO RELATED APPLICATION

Korean Patent Application No. 10-2016-0160664 filed on Nov. 29, 2016, and entitled, "Electrode Assembly and Rechargeable Battery Including the Same," is incorporated by reference herein in its entirety.

BACKGROUND

1. Field

One or more embodiments described herein relate to an electrode assembly and a rechargeable battery including an electrode assembly.

2. Description of the Related Art

A rechargeable lithium battery is used to power various electronic devices. Such a battery uses an organic electrolytic solution and thus has a greater discharge voltage and energy density than a battery which uses an alkaline aqueous solution Some rechargeable lithium batteries have an electrode assembly that includes a negative electrode, a separator, and a positive electrode formed in a stacked or spirally wound configuration. The negative electrode includes a carbon-based negative active material. Particles of the negative active material may be stacked in various directions on the surface of a base member of the negative electrode.

Electrical characteristics of such a battery may change depending on the angle formed between the negative active material particles and the base member. In one proposed structure, the negative electrode active material particles are oriented in a constant direction with respect to the base member surface. Such an orientation may be carried out after coating the negative active material. A rolling process is then performed after orientation. However, the rolling process may cause the negative active material to be mis-oriented, thereby degrading performance of the battery.

SUMMARY

In accordance with one or more other embodiments, a spirally-wound electrode assembly includes a negative electrode and a positive electrode including base members and active material layers, the active material layers located at at least one side of a corresponding one of the base members; and a separator between the negative electrode and the positive electrode, wherein the active material layer of the negative electrode includes an alternating arrangement of orientation portions and non-orientation portions and wherein each of the orientation portions is oriented to have a constant angle with respect to one side of the negative electrode.

The orientation portions and the non-orientation portions may be alternately arranged along a direction perpendicular to a spiral-winding axis of the electrode assembly. A width of each of the orientation portions in the direction perpendicular to the spiral-winding axis may be greater than a width of each of the orientation portions in a direction parallel to the spiral-winding axis.

The area of each of the orientation portions may be greater than an area of each of the non-orientation portions. The area of each of the non-orientation portions may be 3% or more and 50% or less with respect to an entire area of the base member of the negative electrode. The orientation portions and the non-orientation portions may be arranged in a mosaic format.

The active material layer of the negative electrode may include a carbon-based negative active material, and the active material layer of the negative electrode may have a value of degree of divergence (DD) as defined in Equation 1, a DD value of the orientation portion is 19 or more and 60 or less, and a DD value of the non-orientation portion is 5 or more and 19 or less:

$$DD(\text{Degree of Divergence}) = (I_a/I_{total}) \times 100 \quad (1)$$

where $I_a$ denotes the sum of peak intensity at a non-planar angle in measurement of XRD using a CuKα line, and $I_{total}$ denotes a sum of peak intensity at all angles in measurement of XRD using the CuKα line. A difference between the DD value of the orientation portion and the DD value of the non-orientation portion may be 10 or more. The carbon-based negative active material may be artificial graphite or a mixture of artificial graphite and natural graphite.

In accordance with one or more other embodiments, a rechargeable battery includes an electrode assembly as described herein, a case including the electrode assembly; and an electrolyte in the case together with the electrode assembly.

In accordance with one or more other embodiments, an electrode includes a base member; and an active material layer adjacent to the base member, wherein the active material layer includes an alternate arrangement of orientation portions and non-orientation portions and wherein the orientation portion is oriented to have a constant angle with respect to one side of the base member. The electrode may be a negative electrode.

The orientation portions and the non-orientation portions may be alternately arranged along a direction perpendicular to a spiral-winding axis. A width of each of the orientation portions in the direction perpendicular to the spiral-winding axis may be greater than a width of each of the orientation portions in a direction parallel to the spiral-winding axis. The area of each of the orientation portions may be greater than an area of each of the non-orientation portions. The area of each of the non-orientation portions may be 3% or more and 50% or less with respect to an entire area of the base member. The orientation portions and the non-orientation portions may be arranged in a mosaic format.

The active material layer may include a carbon-based negative active material, and the active material layer may have a value of degree of divergence (DD) as defined in Equation 1, a DD value of the orientation portion is 19 or more and 60 or less, and a DD value of the non-orientation portion is 5 or more and 19 or less:

$$DD(\text{Degree of Divergence}) = (I_a/I_{total}) \times 100 \quad (1)$$

where $I_a$ denotes the sum of peak intensity at a non-planar angle in measurement of XRD using a CuKα line, and $I_{total}$ denotes a sum of peak intensity at all angles in measurement of XRD using the CuKα line. A difference between the DD value of the orientation portion and the DD value of the non-orientation portion may be 10 or more. The carbon-based negative active material may be artificial graphite or a mixture of artificial graphite and natural graphite.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
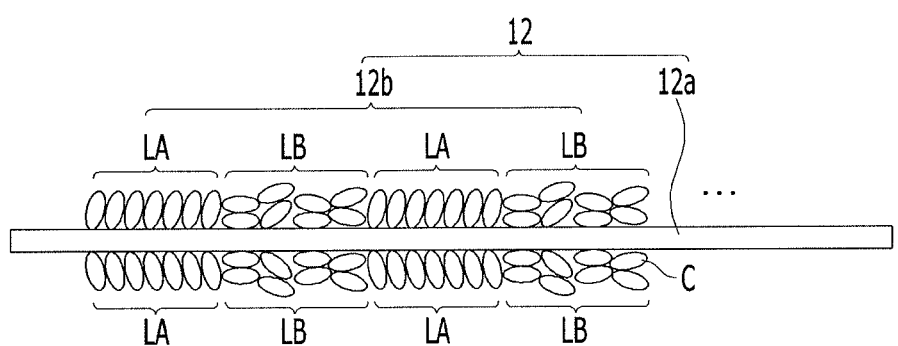
FIG. 1 illustrates an embodiment of a negative electrode.

Example embodiments are described with reference to the drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments (or portions thereof) may be combined to form additional embodiments In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates a cross-sectional view of an embodiment of a negative electrode 12, which, for example, may be used in a lithium rechargeable battery. The negative electrode 12 includes a base member 12a and an active material layer 12b that is provided on the base member 12a and includes a carbon-based negative electrode active material.

The active material layer 12b includes an orientation portion LA and a non-orientation portion LB. The orientation portion LA and the non-orientation portion LB may have values of degrees of divergence as defined in Equation 1:

$$DD\text{(Degree of Divergence)} = (I_a/I_{total}) \times 100, \quad (1)$$

where $I_a$ denotes the sum of peak intensity at a non-planar angle in measurement of XRD using a CuKα line, and $I_{total}$ denotes the sum of peak intensity at all (or a predetermined range of) angles in measurement of XRD using the CuKα line.

The non-planar angles are $2\theta=42.4\pm0.2°$, $43.4\pm0.20$, $44.6\pm0.2°$, and $77.5\pm0.2°$ in measurement of XRD using the CuKα line. These angles indicate a (100) plane, a (101)R plane, a (101)H plane, and a (110) plane. Graphite may be classified into a hexagonal structure having an ABAB-type stacking sequence and a rhombohedral structure depending on a stacking order of graphene layers. The R plane implies a rhombohedral structure and the H plane implies a hexagonal structure.

In addition, all (or the predetermined range of) angles denote $2\theta=26.5\pm0.2°$, $42.4\pm0.20$, $43.4\pm0.2°$, $44.6\pm0.2°$, $54.7\pm0.2°$, and $77.5\pm0.2°$ in measurement of XRD using the CuKα line. These angles indicate a (002) plane, a (100) plane, a (101)R plane, a (101)H plane, a (004) plane, and a (110) plane. The peak at $2\theta=43.4\pm0.2°$ may be an overlap of the carbon-based (101)R plane and a current collector, e.g., a peak corresponding to a (111) plane of Cu.

A peak intensity value may correspond, for example, to a height value of a peak or an integral area value of a peak. In the present exemplary embodiment, the peak intensity value corresponds to an integral area value of a peak.

In an exemplary embodiment, the XRD measurement is performed using a CuKα line as a target line. The target line may be extracted using a monochromator for improvement of peak intensity resolution. In addition, the measurement may be performed under conditions of $2\theta=100$ to $800$, a scan speed (°/S) of 0.044 to 0.089, and a step size of 0.026°/step.

The value of DD in the exemplary embodiment may be acquired by measuring XRD with respect to a negative electrode formed by fully charging/discharging a lithium rechargeable battery including the negative electrode and dissembling the battery in the fully discharged state. The charging and discharging may be performed once or two times at 0.1C to 0.2C.

In measurement of XRD of the negative electrode using the CuKα line, a peak intensity ratio of the (004) plane with respect to the peak intensity of the (002) plane (e.g., $I_{004}/I_{002}$) may be 0.04 or more, and in one embodiment may be 0.04 or more and 0.07 or less. When the $I_{004}/I_{002}$ is 0.04 or more, DC internal resistance is not increased, rate characteristics (e.g., particularly high rate characteristics) may be improved, and cycle life characteristics may be improved. Such a DD value is a property value that is maintained even after charging and discharging.

According to one exemplary embodiment, the DD value indicates a degree of orientation of the negative active materials C of the orientation portion LA with a constant angle. For better understanding and ease of description, a carbon-based active material (e.g., a graphite particle) is illustrated as the negative active material.

In this case, the DD value of the orientation portion LA is 19 or more and 60 or less, the DD value of the non-orientation portion LB is 5 or more and 19 or less, and the difference in DD values of the orientation portion LA and the non-orientation portion LB is 10 or more. Thus, a negative active material in the orientation portion LA is oriented with a more constant angle than an active material in the non-orientation portion LB.

When the DD value of the orientation portion LA is 19 or more and 60 or less, the negative active material is sufficiently oriented, but not horizontally lying with respect to one side of the base member 12a, such that Li ions in the negative electrode can be easily moved in the negative electrode. The DD value of the non-orientation portion LB has a relatively lower DD value than the orientation portion LA. As a result, the non-orientation portion LA may be less intensively oriented than the orientation portion LA.

The non-orientation portion LB may not undergo an additional orientation process after coating of the negative active material. The negative active material of the orientation portion LA may be oriented by using magnetic flux.

Figure 2:
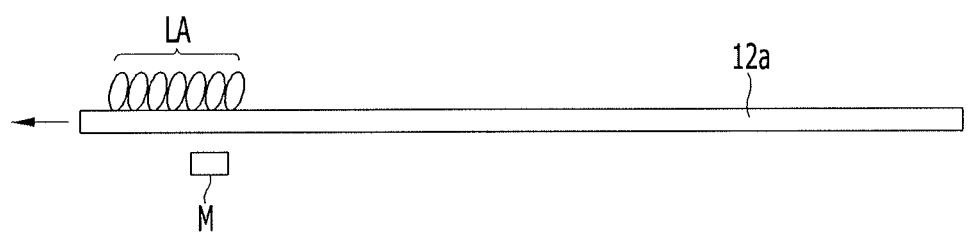
FIGS. 2-7 illustrate stages of an embodiment of a method for manufacturing a negative electrode.

FIGS. 2-7 illustrate stages of an embodiment of a method for manufacturing the negative electrode. As shown in FIG. 2, the base member 12a is prepared and a magnet M is placed below the base member 12a. Next, a negative active material is coated on the base member 12a. Then, the negative active material is oriented using magnetic flux to form the orientation portion LA. For example, 97.5 wt % of artificial graphite, 1.5 wt % of styrene-butadiene rubber, and 1 wt % of carboxymethyl cellulose are mixed in a water solvent to prepare a negative active material slurry having viscosity of 2300 cps (in this case, the temperature may be 25° C.).

The magnet according to the exemplary embodiment may easily apply or remove magnetic flux as necessary. In this case, the degree of orientation may be controlled by controlling the intensity of the magnetic flux, the exposure time of the magnetic flux, and/or the viscosity of the negative electrode active material composition.

After a Cu foil is placed on an upper portion of a magnet having magnetic flux intensity of 4000 Gauss, the prepared negative active material slurry is coated on the Cu foil and then may be exposed to the magnetic flux for 9 s. In this case, a DD value of an orientation portion (formed through exposure to the magnetic flux) may be 39.

Figure 3:
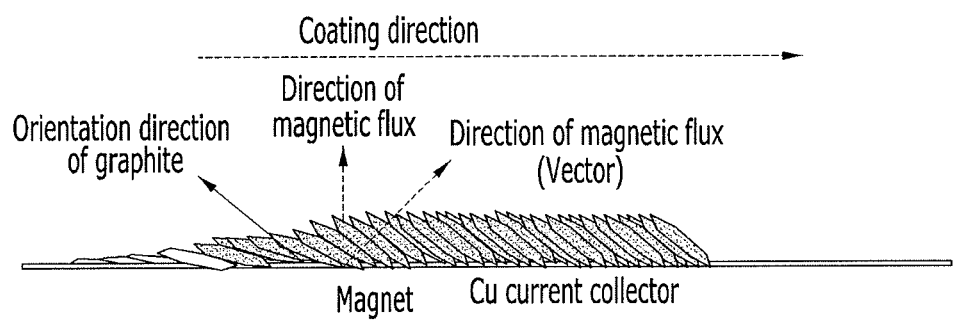

Referring to FIG. 3, the negative electrode may be formed by continuously coating the negative active material while moving a negative base member. In this case, the magnetic flux is formed in a direction perpendicular to the negative base member. However, the direction has a constant angle by a vector function depending on the coating speed, e.g., movement speed of the negative base member. Thus, the negative active material in the active material layer may have a standing shape, e.g., oriented with a constant angle with respect to the surface of the base member of the negative electrode.

Figure 4:
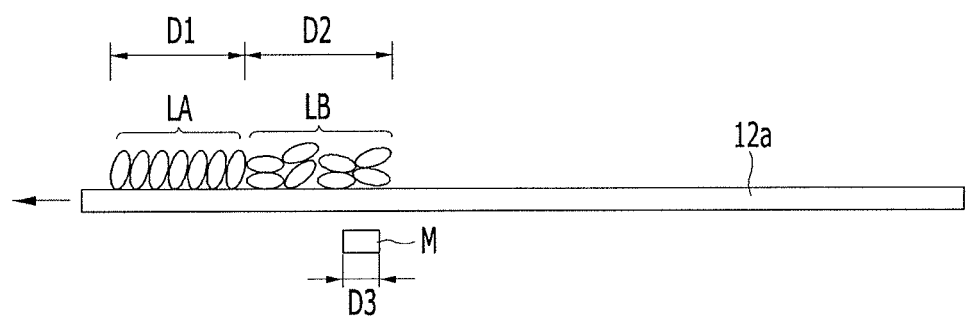

Next, as shown in FIG. 4, the negative active material is coated on the negative base member while no magnetic flux is formed. The non-orientation portion LB is formed as a result. The DD value of the non-orientation portion LB may be 18.

The width D1 of the orientation portion LA and the width D2 of the non-orientation portion LB may be modified in various ways, for example, by controlling the movement speed of the negative base member and whether or not the magnetic flux is applied. The width D3 of the magnet M may be set to be less than the widths D1 and D2 of the orientation portion LA and the non-orientation portion LB.

Figure 5:
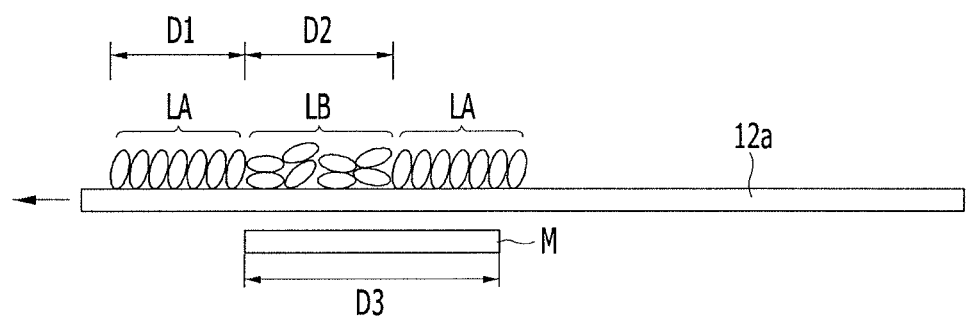

Referring to FIG. 5, since the negative electrode continuously moves, when the magnet M is larger than the non-orientation portion LB, the orientation portion LA may be above the magnet M and the non-orientation portion LB may not be completely deviated from the magnet M. Thus, process time may be increased because the non-orientation portion LB must be in a standby state, without applying magnetic flux to the orientation portion LA, until the non-orientation portion LB is deviated from the magnet M and thus not affected by the magnetic flux.

This may be the same when the width D3 of the magnet M is greater than the width D1 of the orientation portion LA.

Figure 6:
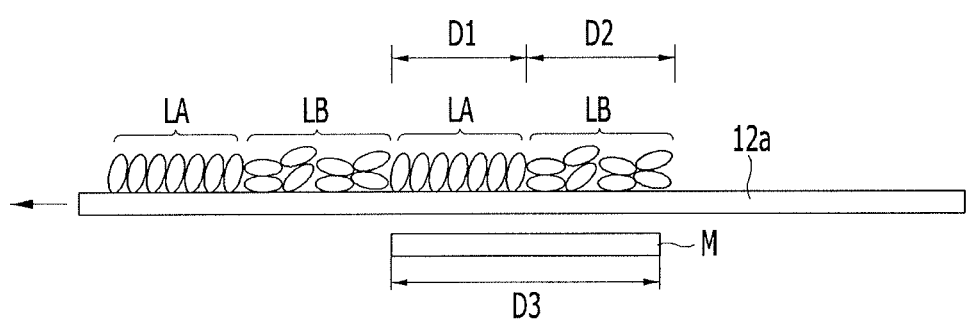

As shown in FIG. 6, after the non-orientation portion LB is completely deviated from the influence of the magnetic flux, the orientation portion LA and the non-orientation portion LB are located together on the magnet M, even though the orientation portion LA is on the magnet M. This is because the width of the orientation portion LA is less than the width of the magnet M. As a result, the width D3 of the magnet M may be less than the widths D1 and D2 of the orientation portion LA and the non-orientation portion LB.

The processes for forming the orientation portion and the non-orientation portion illustrated in FIGS. 2-4 may then be repeated.

Figure 7:
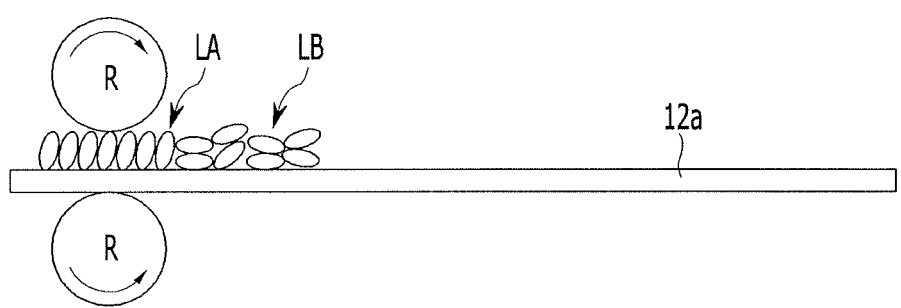

Next, as shown in FIG. 7, the negative electrode 12 (that includes the negative base member and the active material layer) is formed by drying and then rolling the negative electrode. When the orientation portion LA and the non-orientation portion LB are formed as in the exemplary embodiment, the non-orientation portion LB may serve as a barrier rib when a roller R presses the negative active material during the rolling process. As a result, misorientation of the negative active material may be prevented.

For example, the negative active material of the non-orientation portion LB may be relatively less intensively oriented compared to the orientation portion LA. Thus, the negative active material of the non-orientation portion LB may include more particles oriented in parallel with one side of the base member 12a than the negative active material of the orientation portion LA.

The negative active material of the non-orientation portion LB may have a relatively large area in contact with the one side of the base member 12a. As a result, frictional force between the negative active material and the one side of the base member 12a may be increased. Accordingly, even though the negative active material is pressed during the rolling process, the active material of the orientation portion LA is supported by the active material of the non-orientation portion LB. The orientation format of the orientation portion LA may therefore be maintained.

As described, even though ion movability in the non-orientation portion LB may be lower than that of the orientation portion LA, the non-orientation portion LB may have a smaller area than the orientation portion LA. This may prevent the orientation portion LA from being misoriented. In one embodiment, the area of the non-orientation portion LB may be, for example, 3% or more or 50% or less in the entire area of the active material layer.

The negative active material layer may be formed in only one side of the negative base member. In one embodiment, as shown in FIGS. 2-6, the active material layer may be formed in one side of the negative base member, and the orientation portion and the no-orientation portion may be formed in the other side of the negative base member using the same process. Thus the active material layer may be formed in both sides of the negative base member by performing a rolling process (e.g., refer to FIG. 1).

In the above-described exemplary embodiment, the orientation portion LA and the non-orientation portion LB are alternately arranged along the length direction of the negative electrode (or a movement direction of the base member). In one embodiment, the orientation portion LA and the non-orientation portion LB may be alternately arranged along a width direction of the negative electrode.

Figure 8:
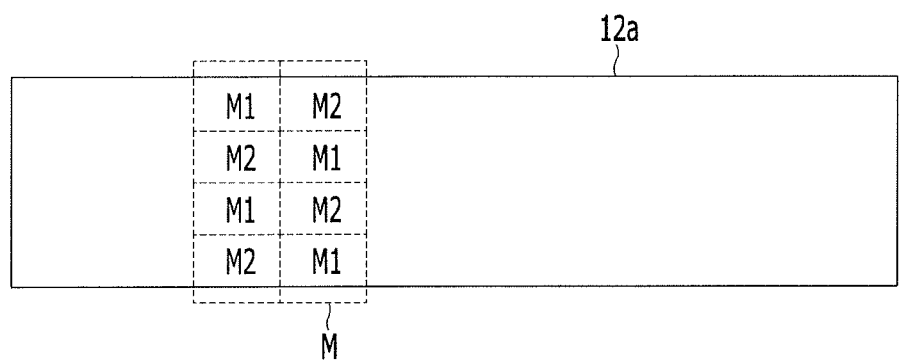
FIG. 8 illustrates an embodiment a member oriented relative to a magnet.

FIG. 8 illustrates a base member and a magnet according to another exemplary embodiment. As shown in FIG. 8, a negative active material is coated on a negative base member 12a, and a magnetic flux is applied thereto using a magnet M to orient the negative active material. In this case, a magnet portion M1 and a non-magnet portion M2 may be alternately disposed in a width direction of the negative base member 12a. When the magnet portion M1 and the non-magnet portion M2 arranged in the width direction of the negative base member form a single column, the magnet M may include a plurality of columns and the magnet portion M1 and the non-magnet portion M2 are alternately disposed in a row direction such that a mosaic format may be formed.

As shown in FIG. 8, when the magnet M has a pattern, the negative base member does not continuously move, as shown in FIGS. 2-7. Instead, a negative electrode may be formed by iteratively performing an operation of applying a magnetic flux, an operation of removing the magnetic flux, and an operation of moving the negative base member. In the operation of moving the negative base member, the negative base member may be moved discontinuously by the width of the magnet. The negative base memory may be moved in a different manner in another embodiment.

Figure 9:
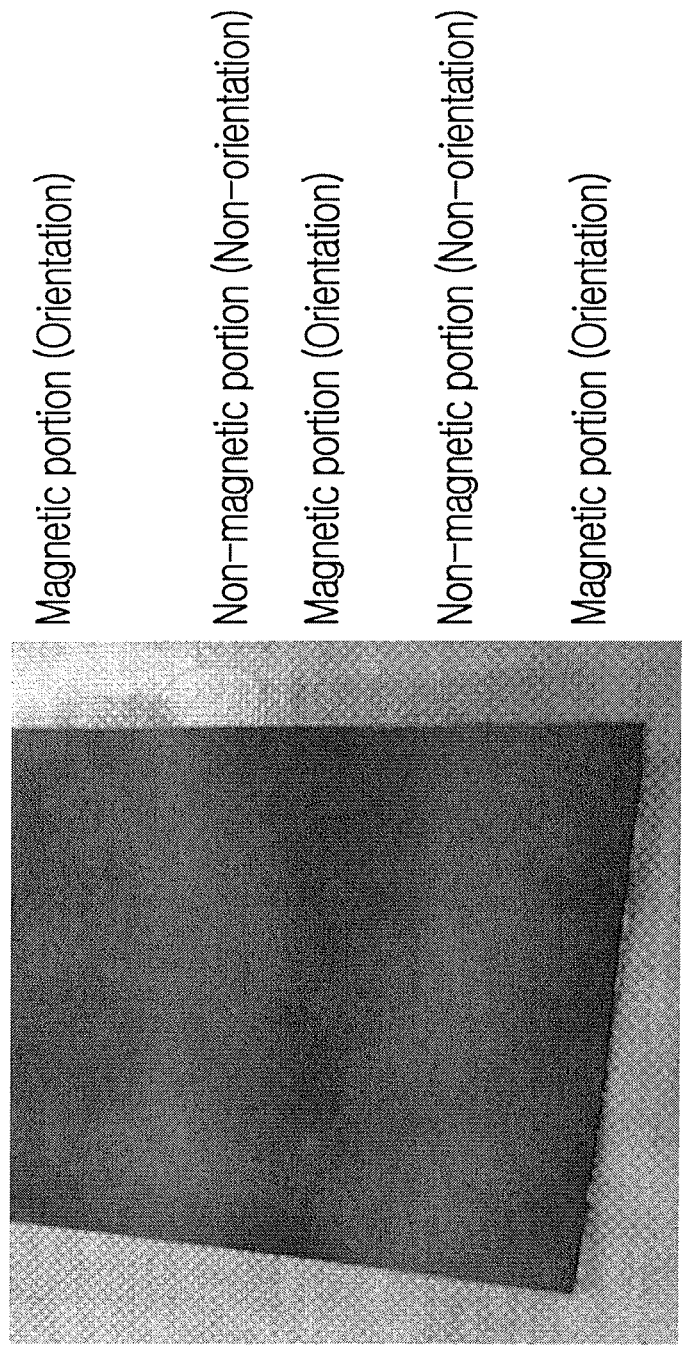
FIGS. 9-11 illustrate photographs of embodiments of a negative electrode.
Figure 10:
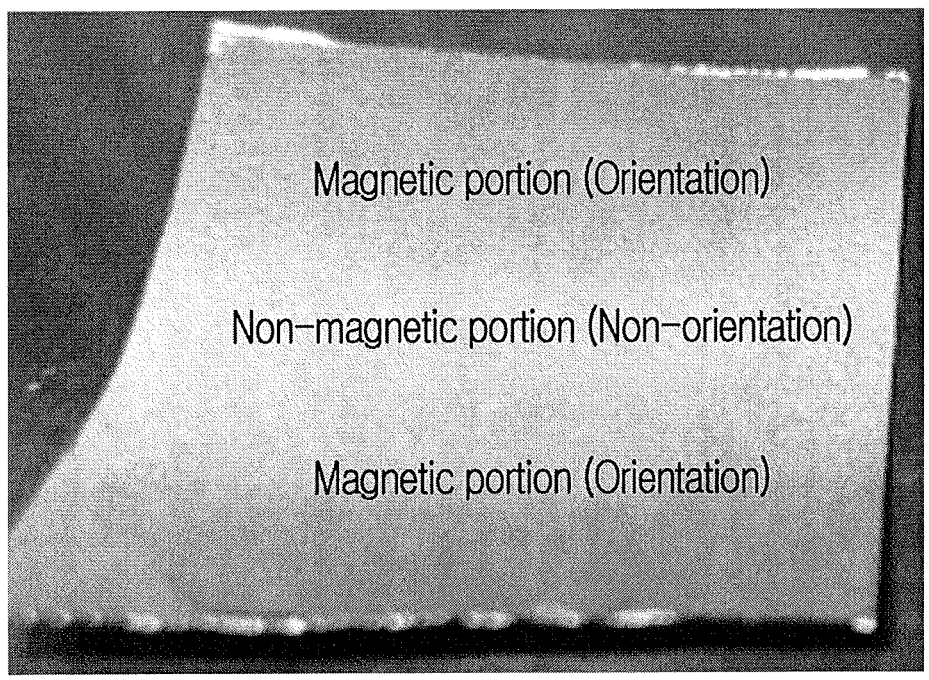
Figure 11:
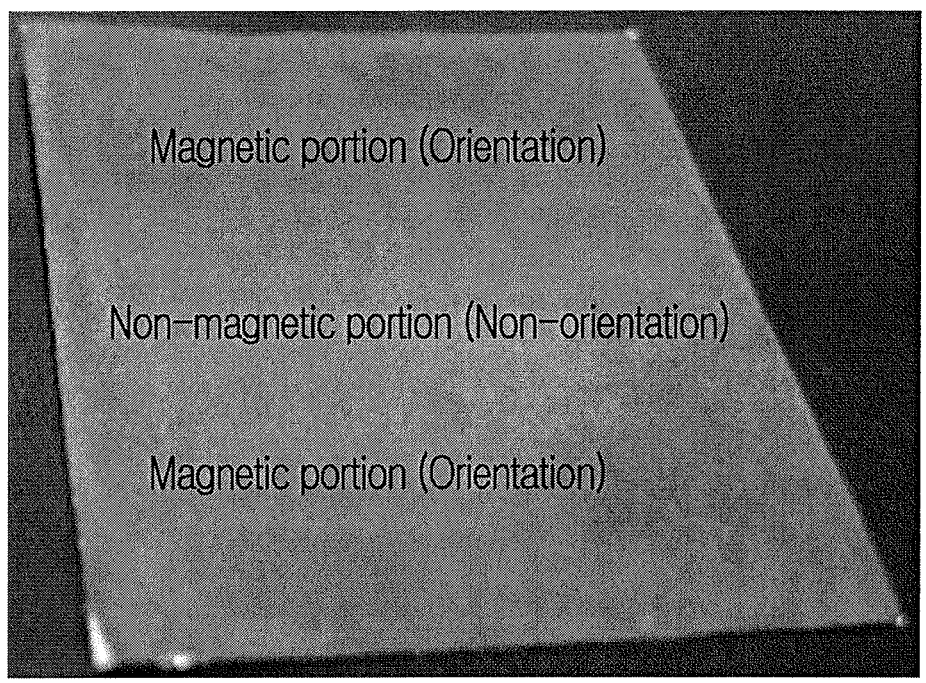

FIGS. 9-11 are photographs illustrating examples of a negative electrode according to exemplary embodiments. FIG. 9 is a photograph illustrating an example of a negative electrode after coating a negative active material thereon and then performing orientation using magnetic flux. FIG. 10 is a photograph illustrating an example of the negative electrode where a rolling process is carried out after the orientation. FIG. 11 is a photograph illustrating an example of the negative electrode in a discharge state after charging/discharging is preformed after being manufactured as a rechargeable battery. FIGS. 10 and 11 are enlarged photographs of a part (i.e., 30 mm×30 mm) of the negative electrode of FIG. 9.

In FIG. 9, a magnet is used in the orientation process. The magnet has a pattern of magnetic portions and non-magnetic portions alternately arranged along a width direction of the negative base member. After the orientation process, an orientation portion and a non-orientation portion are formed, each having the same arrangement as the magnet pattern. The magnetic portion is shown to be darker than the non-magnetic portion and can be also confirmed with the naked eye This is because that negative active materials in the orientation portion and the non-magnetic portion, that is, the degree of orientation of the carbon particles are different so that angles formed by the carbon particles and the base member are different from each other in the orientation portion and the non-magnetic portion. Therefore, the orientation portion and the non-magnetic portion have a brightness difference such that the orientation portion may be shown to be relatively dark and the non-magnetic portion may be shown to be relatively bright.

Referring to FIG. 10, it can be observed that the relatively bright portion and the relatively dark portion exist and the orientation portion and the non-orientation portions maintain the alternately arranged pattern even after the rolling process. As shown in FIG. 11, it can be observed that the relatively bright portion and the relatively dark portion exist and the orientation portion and the non-orientation portion of the pattern maintain the alternately arranged pattern even after charging/discharging.

As described above, according to the present embodiment, when the orientation portion and the non-orientation portion are formed, the orientation of the negative active material can be maintained even after the rolling process and the rechargeable battery is manufactured. As a result, electrical characteristics may be prevented from being reduced or adversely affected due to misorientation.

Figure 12:
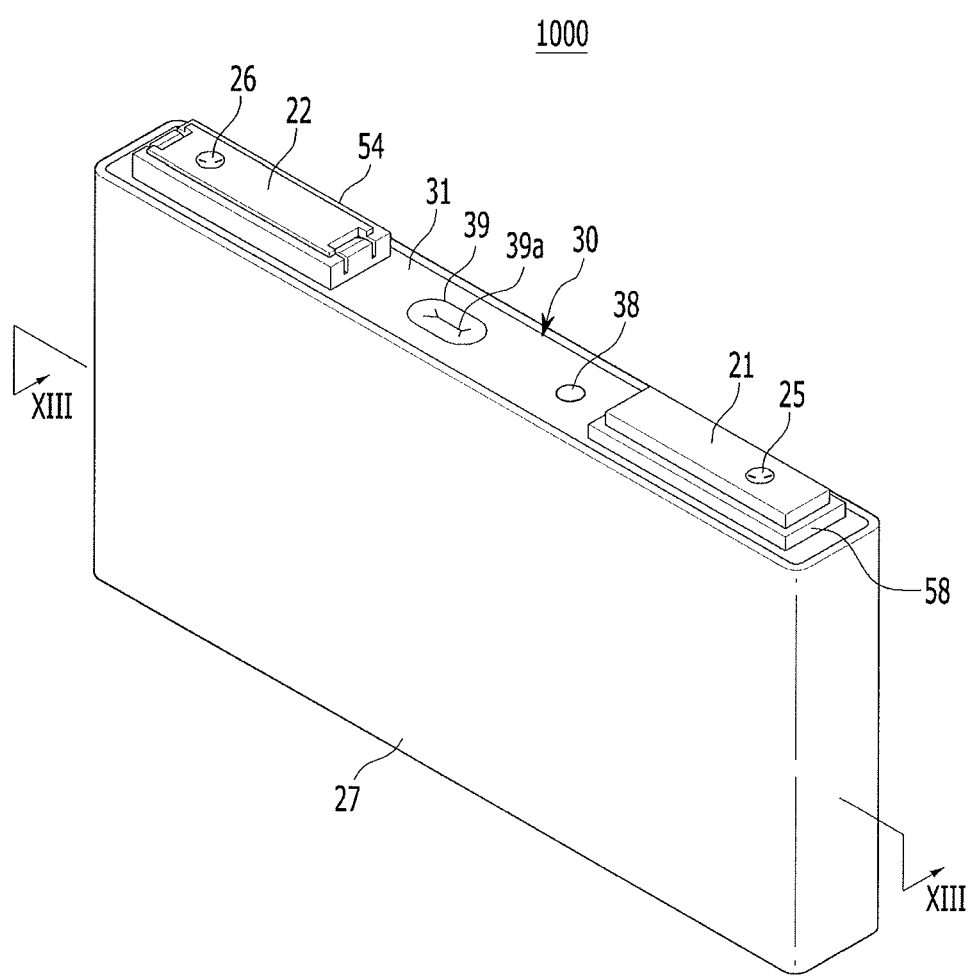
FIG. 12 illustrates an embodiment of a rechargeable battery.
Figure 13:
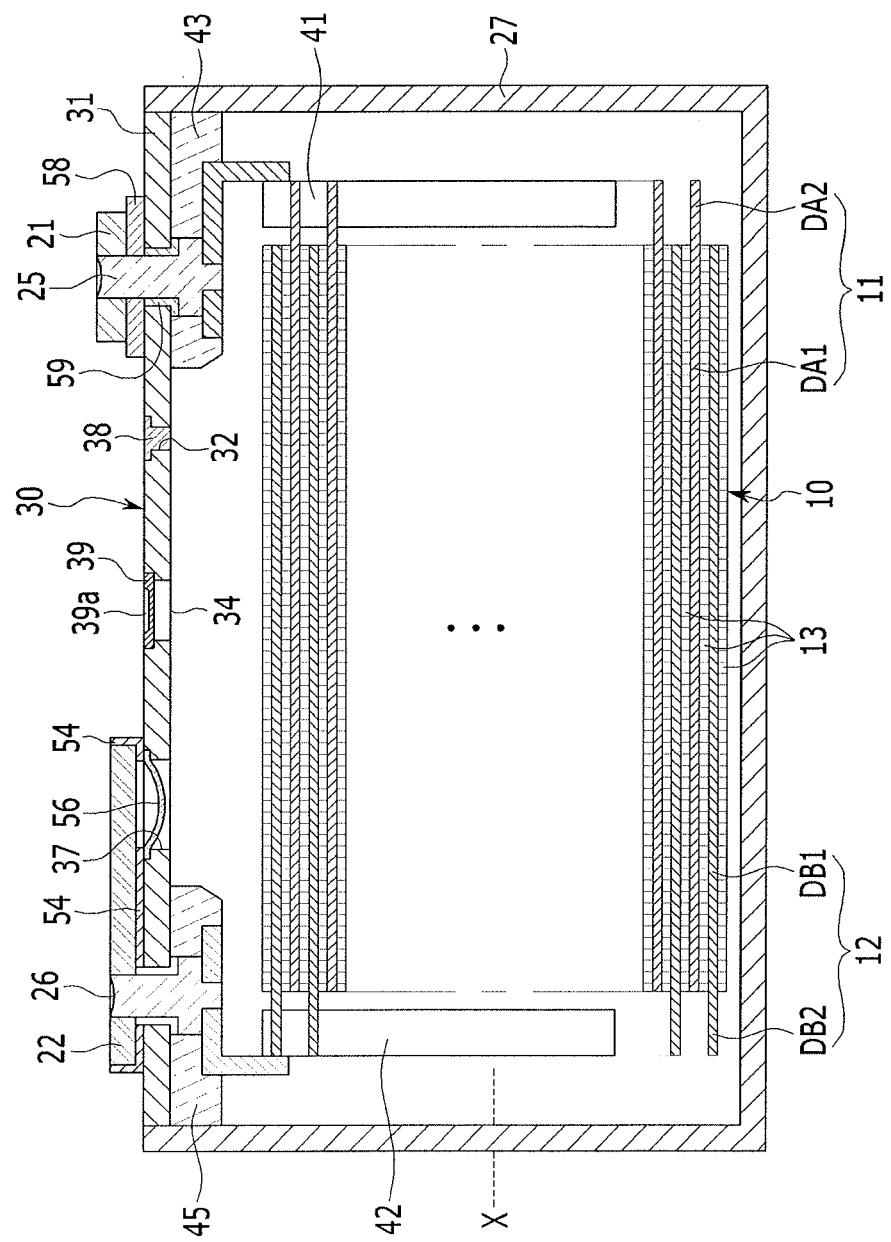
FIG. 13 illustrates a sectional view taken along line XIII-XIII in FIG. 12.

FIG. 12 illustrates a perspective view of an embodiment of a rechargeable battery 1000, and FIG. 13 illustrates a cross-sectional view taken along line XIII-XIII in FIG. 12.

As shown in FIGS. 12 and 13, the rechargeable battery 1000 includes an electrode assembly 10, a case 27 that receives the electrode assembly 10, and a cap assembly 30 provided in an opening of the case 27.

The rechargeable battery 1000 may be a prism-shaped lithium ion rechargeable battery. In other embodiments, the rechargeable battery 1000 may have a different shape and/or may be a different type of battery, including but not limited to a lithium polymer battery, a circular-shaped battery, or another type or shape.

The electrode assembly 10 includes a positive electrode 11, a separator 13, and a negative electrode 12 that are sequentially stacked. The separator 13 is between the positive electrode 11 and the negative electrode 12 to provided insulation between the electrodes. The electrode assembly 10 may be formed, for example, as a flat-pressurized jelly roll type by winding the positive electrode (or a first electrode) 11 and the negative electrode (or a second electrode) 12, with the separator 13 interposed therebetween, around a winding shaft X. Then the spirally wound positive electrode 11, separator 13, and negative electrode 12 may be pressed.

The separator 13 may include, for example, polyethylene, polypropylene, or polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The positive electrode 11 and the negative electrode 12 include electrode activation portions DA1 and DB1. An active material layer made of a positive active material is in a base member formed of a thin metal foil and electrode uncoated regions DA2 and DB2 where no active material layer is formed. The electrode uncoated regions DA2 and DB2 may be extension portions that are integrally formed with the base member.

The electrode uncoated region DA2 of the positive electrode 11 may be at one end side of the positive electrode 11 along a length direction of the positive electrode 11. The electrode uncoated region BD2 of the negative electrode 12 may be at one end side of the negative electrode 12 along a length direction of the negative electrode 12. Thus, for example, the electrode uncoated region DA2 of the positive electrode 11 and the electrode uncoated region DB2 of the negative electrode 12 may be opposite to each other with respect to the electrode activation portions DA1 and DB1.

A base member of the positive electrode 11 may be made of a predetermined conductive material (e.g., aluminum). The positive active material layer may be formed using, for example, a compound (lithiated intercalation compound) capable of reversible intercalation and deintercalation of lithium. For example, one or more types of complex oxides of metals (e.g., cobalt, manganese, nickel, or a combination thereof) may be used. In the positive electrode, the content of the positive electrode active material may be, for example, 90 wt % to 98 wt % based on the total weight of the active material layer of the positive electrode.

In one exemplary embodiment, the positive electrode active material may further include a binder and a conductive material. In this case, the content of the binder and the conductive material may be, for example, 1 wt % to 5 wt % with respect to the total weight of the active material layer of the positive electrode.

The binder serves to adhere the positive electrode active material particles to each other, and to adhere the positive electrode active material to the positive electrode base member. The binder may include, for example, polyvinyl alcohol, carboxymethyl cellulose, hydroxypropylcellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene butadiene rubber, acrylated styrene-butadiene rubber, an epoxy resin, or nylon.

The conductive material is used to provide conductivity to an electrode. Any suitable electronic conductive material that does not cause a chemical change in a battery may be used.

The electrode activation portion DB of the negative electrode may be the negative electrode illustrated, for example, in FIG. 1. An orientation portion and a non-orientation portion of the negative electrode may be alternately arranged along a direction that is perpendicular to a winding axis of the electrode assembly. In one embodiment, the width of the orientation portion in the direction that is perpendicular to the winding axis may be greater than a width of the orientation portion in a direction that is parallel with the winding axis.

The negative electrode may have a base member made of, for example, copper or nickel. The negative electrode active material of the negative electrode material, which form an active material layer of the negative electrode, may be made of an active material such as graphite or carbon. The active material layer of the negative electrode may include an orientation portion and a non-orientation portion. The orientation portion and the non-orientation portion may be alternately arranged along a length direction of the negative electrode.

The carbon-based negative electrode active material may be, for example, artificial graphite or a mixture of artificial graphite and natural graphite. When a crystalline carbon-based material, which is the artificial graphite or the mixture of artificial graphite and natural graphite, is used as the negative active material, the crystallographic properties of particles are further developed, compared to the case where an amorphous carbon-based active material is used. As a result, orientation properties of a carbon material in the electrode plate with respect to external magnetic flux may be further improved. The artificial graphite and natural graphite may be formed in various predetermined shapes, e.g., a sphere, a plate, a flake, a fiber, or another shape. When the mixture of the artificial graphite and the natural graphite is used, a mixing ratio may be, for example, 70:30 wt % to 95:5 wt %.

The active material layer of the negative electrode may further include at least one of a Si-based negative active material, a Sn-based negative active material, and $LiMO_x$ (M=metal). When the active material layer of the negative electrode further includes the above-stated materials (e.g., when the carbon-based negative active material is included as a first negative active material and the negative active material is included as a second negative active material), the mixing ratio of the first negative active material and the second negative active material may be, for example, 50:50 wt % to 99:1 wt %.

The $LiMO_x$ (M=metal)-based negative active material may be a lithium vanadium oxide. The Si-based negative active material may be, for example, Si, a Si—C complex, $SiO_x$ (0<x<2), a Si-Q alloy (Q is an alkali metal, an alkaline-earth metal, a Group 13 element, a Group 14 element, a Group 15 element, a Group 16 element, a transition metal, a rare earth element, or a combination thereof, and is not Si). The Sn-based negative active material may be, for example, Sn, $SnO_2$, a Sn—R alloy (R is an alkali metal, an alkaline-earth metal, a Group 13 element, a Group 14 element, a Group 15 element, a Group 16 element, a transition metal, a rare earth element, or a combination thereof, and is not Si). At least one of these materials may be mixed with $SiO_2$. Q and R may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The negative active material layer may include a binder and, optionally, a conductive material. The amount of binder in the negative active material may be, for example, 1 wt % to 5 wt % with respect to the entire weight of the negative active material. When the conductive material is further included, 90 wt % to 98 wt %, of the negative active material, 1 wt % to 5 wt % of the binder, and 1 wt % to 5 wt % of the conductive material may be used, for example.

The binder serves to adhere the negative active material particles to each other and to adhere the negative active material to the negative electrode base member. The binder may be, for example, a non-aqueous binder, an aqueous binder, or a combination thereof. Examples of the non-aqueous binder include polyvinyl chloride, carboxylated polyvinyl chloride, polyvinyl fluoride, an oxide-containing polymer, polyvinylpyrrolidone, polyurethane, polytetrafluoroethylene, polyvinylidene fluoride, polyethylene, polypropylene, polyamideimide, polyimide, or a combination thereof may be used.

Examples of the aqueous binder include styrene-butadiene rubber, acrylated styrene-butadiene rubber (SBR), acrylonitrile-butadiene rubber, acrylic rubber, butyl rubber, an ethylene propylene copolymer, polyepichlorohydrin, polyphosphazene, polyacrylonitrile, polystyrene, an ethylene propylene diene copolymer, poly(vinylpyridine), latex, a polyester resin, an acrylic resin, a phenol resin, an epoxy resin, polyvinyl alcohol, an acrylate resin, or a combination thereof may be used.

When the aqueous binder is used as the negative binder, a cellulose-based compound that provides viscosity may be further included as a thickener. As the cellulose-based compound, one or more of carboxymethyl cellulose, hydroxypropyl methylcellulose, methylcellulose, or an alkali metal salt may be used in combination. The alkali metal salt may be, for example, Na, K, or Li. The amount of thickener may be, for example, 0.1 wt % to 3 wt % with respect to 100 wt % of the negative active material.

The conductive material improves electrical conductivity of a negative electrode. Any electrically conductive material may be used as a conductive agent unless it causes a chemical change. Examples of the conductive material include a carbon-based material (e.g., natural graphite, artificial graphite, carbon black, acetylene black, ketjen black, or carbon fiber), a metal-based material (e.g., metal powder or metal fiber of copper, nickel, aluminum, silver, or another metal), and a conductive polymer such as a polyphenylene derivative, or a mixture thereof.

A BET specific surface area of the negative active material layer may be, for example, 3.0 $m^2/g$ or less, and in one embodiment may be 0.6 $m^2/g$ to 1.2 $m^2/g$. When the BET specific surface area of the negative active material layer is 3.0 $m^2/g$ or less, electrochemical lifetime characteristics of a cell may be improved.

For the BET measurement, a lithium rechargeable battery that includes the negative electrode is charged/discharged. Then, the battery in the fully discharged state is disassembled to obtain a negative electrode. Then, the obtained negative electrode is cut to a predetermined size and inserted into a BET sample holder and a nitrogen gas adsorption method is performed.

The negative electrode may have a cross-section loading level UL of, for example, 6 $mg/cm^2$ to 65 $mg/cm^2$.

The electrode assembly 10 may be received in the case 27 together with an electrolyte. The electrolyte may include, for example, a non-aqueous organic solvent and a lithium salt. The non-aqueous organic solvent serves as a medium for transmitting ions taking part in the electrochemical reaction of a battery. The lithium salt is dissolved in an organic solvent and supplies lithium ions in a battery, and thus basically operates the rechargeable lithium battery and improves lithium ion transportation between positive and negative electrodes therein.

Examples of the lithium salt include $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein x and y are natural numbers, for example integers of 1 to 20), LiCl, LiI, and $LiB(C_2O_4)_2$ (lithium bis(oxalato) borate: LiBOB) as a supporting electrolytic salt, or a combination thereof. The concentration of lithium salt may be, for example, in the range of 0.1 M to 2.0 M. When the concentration of the lithium salt is in this range, the electrolyte has improved conductivity and viscosity and excellent electrolyte performance, and lithium ions can move effectively.

The case 27 may be made of a metal (e.g., aluminum) and may have a cuboid shape. The case 27 may have an open side. Thus, a cap plate may be provided in the open side of the case.

The cap assembly 30 includes a cap plate 31, a positive terminal 21, and a negative terminal 22. The cap plate 31 is coupled to the case 27 in a manner which closes the open side of the case 27. The positive terminal 21 protrudes outside the cap plate 31 and is electrically connected with the positive electrode 11. The negative terminal 22 protrudes outside the cap plate 31 and is electrically connected with the negative electrode 12.

The cap plate 31 has the shape of a plate extended in one direction and is combined to the opening of the case 27. The cap plate 31 includes an inlet 32 that penetrates into the cap plate 31. The inlet 32 is provided to allow for injection of an electrolyte solution. A sealing cap 38 is provided in the inlet 32. A vent plate 39 having a notch 39a is in a vent hole 34 in the cap plate 31. The notch 39a is set to be opened at a predetermined pressure.

The positive terminal 21 and the negative terminal 22 protrude above the cap plate 31. The positive terminal 21 is electrically connected with the positive electrode 11 through a current collector 41. The negative terminal 22 is electrically connected with the negative electrode 12 through a current collector 42.

A terminal connection member 25 electrically connects the positive terminal 21 and the current collector 41 and is between the positive terminal 21 and the current collector 41. The terminal connection member 25 is inserted into a hole in the positive terminal 21. An upper end of the terminal connection member 25 is fixed to the positive terminal 21 by welding. A lower end of the terminal connection member 25 is fixed to the current collector 41 by welding.

A gasket 59 is inserted into the hole (through which the terminal connection member 25 penetrates) for sealing between the terminal connection member 25 and the cap plate 31. A lower insulation member 43 (into which a lower portion of the terminal connection member 25 is inserted) is below the cap plate 31. A connection plate 58 (through which the positive terminal 21 and the cap plate 31 are electrically connected with each other) is between the positive terminal 21 and the cap plate 31. The terminal connection member 25 is installed to be inserted into the connection plate 58. Accordingly, the cap plate 31 and the case 27 are charged with the positive electrode 11.

A terminal connection member 26 is between the negative terminal 22 and the current collector 42 to provide electrical connection therebetween. The terminal connection member 26 is inserted into a hole in the negative terminal 22. An upper end of the terminal connection member 26 is fixed to the negative terminal 22 by welding. A lower end of the terminal connection member 26 is fixed to the current collector 42 by welding.

The gasket 59 is inserted into the hole (through which the terminal connection member 26 penetrates between the negative terminal 22 and the cap plate 31) for sealing therebetween. An upper insulation member 54 is between the negative terminal 22 and the cap plate 31 to provide insulation therebetween. The terminal connection member 26 may be inserted into a hole of the upper insulation member 54, and the upper insulation member 54 may surround an end of the negative terminal 22.

A lower insulation member 45 insulates the negative terminal 22 and the current collector 42 in the cap plate 31, and may be provided below the cap plate 31.

A short-circuit hole 37 is in the cap plate 31, and a short-circuit member 56 is in the short-circuit hole 37. The short-circuit member 56 includes a curved portion that is curved downwardly in a convex arc shape. An edge portion is outside the curved portion and is fixed to the cap plate 31. The upper insulation member 54 may have a cutout portion that overlaps the short-circuit hole 37. The short-circuit member 56 overlaps the negative terminal 22 exposed through the cutout portion.

The short-circuit member 56 is electrically connected with the cap plate 31. When an internal pressure of the rechargeable battery 1000 is increased, the short-circuit member 56 is deformed to cause a short circuit between the positive electrode and the negative electrode. For example, when a gas is generated due to an abnormal reaction in the rechargeable battery, the internal pressure of the rechargeable battery is increased. When the internal pressure of the rechargeable battery reaches a level greater than a predetermined pressure, the curved portion is deformed to have an upwardly convex shape. As a result, the negative terminal 22 and the short-circuit member 56 contact each other, thereby causing a short circuit.

The negative terminal 22 may further include at least one protrusion toward the short-circuit member 56 to facilitate the short circuit of the negative terminal 22 and the short-circuit member 56. The protrusion and the short-circuit member 56 are spaced apart from each other.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:
1. An electrode assembly, comprising:
   a negative electrode and a positive electrode including base members and active material layers, the active material layers located at at least one side of a corresponding one of the base members; and
a separator between the negative electrode and the positive electrode,
wherein:
the active material layer of the negative electrode includes an alternating arrangement of orientation portions and non-orientation portions,
active material particles in each of the orientation portions are oriented such that a long axis of each active material particle forms a constant angle with respect to the at least one side of the negative electrode, and
the active material layer at the orientation portions consists of a same material as the active material layer at the non-orientation portions.

2. The electrode assembly as claimed in claim 1, wherein the orientation portions and the non-orientation portions are alternately arranged along a first direction parallel with a surface of the base member, and alternately arranged along a second direction parallel with the surface of the base member and that crosses the first direction such that the orientation portions and the non-orientation portions are arranged in a mosaic format.

3. The electrode assembly as claimed in claim 2, wherein a width of each of the orientation portions in the second direction is greater than a width of each of the orientation portions in the first direction.

4. The electrode assembly as claimed in claim 2, wherein the electrode assembly has a jelly-roll type structure in which the electrode assembly is spirally wound, the first direction is parallel with a spiral-winding axis, and the second direction is perpendicular to the spiral-winding axis.

5. The electrode assembly as claimed in claim 2, wherein the area of each of the orientation portions is greater than the area of each of the non-orientation portions.

6. The electrode assembly as claimed in claim 5, wherein the area of each of the non-orientation portions is 3% or more and 50% or less with respect to an entire area of the base member of the negative electrode.

7. The electrode assembly as claimed in claim 2, wherein the orientation portions are darker than the non-orientation portions and the non-orientation portions are brighter than the orientation portions.

8. The electrode assembly as claimed in claim 1, wherein:
the active material layer of the negative electrode includes a carbon-based negative active material, and
the active material layer of the negative electrode has a value of degree of divergence (DD) as defined in Equation 1, a DD value of the orientation portion is 19 or more and 60 or less, and a DD value of the non-orientation portion is 5 or more and less than 19:

$$DD(\text{Degree of Divergence}) = (I_a / I_{total}) \times 100 \quad (1)$$

where $I_a$ denotes a sum of peak intensity at a non-planar angle in measurement of XRD using a CuKα line, and $I_{total}$ denotes a sum of peak intensity at all angles in measurement of XRD using the CuKα line.

9. The electrode assembly as claimed in claim 8, wherein a difference between the DD value of the orientation portion and the DD value of the non-orientation portion is 10 or more.

10. The electrode assembly as claimed in claim 8, wherein the carbon-based negative active material is artificial graphite or a mixture of artificial graphite and natural graphite.

11. The electrode assembly as claimed in claim 10, the active material layer of the negative electrode further comprises a Si-based negative active material.

12. A rechargeable battery, comprising:
the electrode assembly as claimed in claim 1;
a case including the electrode assembly; and
an electrolyte in the case together with the electrode assembly.

13. An electrode, comprising:
a base member; and
an active material layer adjacent to the base member,
wherein:
the active material layer includes an alternating arrangement of orientation portions and non-orientation portions,
active material particles in each of the orientation portions are oriented such that a long axis of each active material particle forms a constant angle with respect to one side of the base member, and
the active material layer at the orientation portions consists of a same material as the active material layer at the non-orientation portions.

14. The electrode as claimed in claim 13, wherein the electrode is a negative electrode.

15. The electrode as claimed in claim 13, wherein the orientation portions and the non-orientation portions are alternately arranged along a direction crossing a spiral-winding axis.

16. The electrode as claimed in claim 15, wherein a width of each of the orientation portions in the direction crossing to the spiral-winding axis is greater than a width of each of the orientation portions in a direction parallel to the spiral-winding axis.

17. The electrode as claimed in claim 13, wherein an area of each of the orientation portions is greater than an area of each of the non-orientation portions.

18. The electrode as claimed in claim 17, wherein the area of each of the non-orientation portions is 3% or more and 50% or less with respect to an entire area of the base member.

19. The electrode as claimed in claim 15, wherein the orientation portions and the non-orientation portions are also alternately arranged along a direction parallel to the spiral-winding axis such that the orientation portions and the non-orientation portions are arranged in a mosaic format.

20. The electrode as claimed in claim 13, wherein:
the active material layer includes a carbon-based negative active material, and
the active material layer has a value of degree of divergence (DD) as defined in Equation 1, a DD value of the orientation portion is 19 or more and 60 or less, and a DD value of the non-orientation portion is 5 or more and less than 19:

$$DD(\text{Degree of Divergence}) = (I_a / I_{total}) \times 100 \quad (1)$$

where $I_a$ denotes a sum of peak intensity at a non-planar angle in measurement of XRD using a CuKα line, and $I_{total}$ denotes a sum of peak intensity at all angles in measurement of XRD using the CuKα line.

21. The electrode as claimed in claim 20, wherein a difference between the DD value of the orientation portion and the DD value of the non-orientation portion is 10 or more.

22. The electrode as claimed in claim 20, wherein the carbon-based negative active material is artificial graphite or a mixture of artificial graphite and natural graphite.

* * * * *